US012768276B2

(12) United States Patent
Gondre et al.

(10) Patent No.: US 12,768,276 B2
(45) **Date of Patent: *Oct. 20, 2026**

(54) BLADE WITH COMPOSITE STRUCTURE HAVING IMPROVED PLY DROP ORIENTATION

(71) Applicant: Safran Aircraft Engines, Paris (FR)

(72) Inventors: Guillaume Pascal Jean-Charles Gondre, Moissy-Cramayel (FR); Alain Jacques Michel Bassot, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

This patent is subject to a terminal disclaimer.

(21) Appl. No.: 18/874,957

(22) PCT Filed: Jun. 16, 2023

(86) PCT No.: PCT/FR2023/050880
§ 371 (c)(1),
(2) Date: Dec. 13, 2024

(87) PCT Pub. No.: WO2023/242522
PCT Pub. Date: Dec. 21, 2023

(65) Prior Publication Data

US 2025/0361810 A1 Nov. 27, 2025

(30) Foreign Application Priority Data

Jun. 16, 2022 (FR) ....................................... 2205893

(51) Int. Cl.
*F01D 5/14* (2006.01)
*F01D 5/28* (2006.01)

(52) U.S. Cl.
CPC ............ *F01D 5/147* (2013.01); *F01D 5/282* (2013.01); *F05D 2220/323* (2013.01); *F05D 2240/30* (2013.01); *F05D 2300/6034* (2013.01)

(58) Field of Classification Search
CPC . F01D 5/147; F01D 5/28; F01D 5/282; F01D 5/284; F05D 2300/603–6034
See application file for complete search history.

(56) References Cited

U.S. PATENT DOCUMENTS 5,279,892 A 1/1994 Baldwin et al.
10,099,434 B2 * 10/2018 Anderson ............ F04D 29/324
(Continued)

FOREIGN PATENT DOCUMENTS

EP 1526285 B1 5/2013
EP 3292991 A1 3/2018
(Continued)

OTHER PUBLICATIONS

International Search Report, issued in PCT/FR2023/050880, PCT/ISA/210, dated Oct. 25, 2023.

*Primary Examiner* — Christopher R Legendre
(74) *Attorney, Agent, or Firm* — Birch, Stewart, Kolasch & Birch, LLP

(57) ABSTRACT

A fan blade is composed at least in part of a structure (50) made of composite material comprising a fiber reinforcement and a matrix. The fiber reinforcement includes a plurality of plies that are each formed of warp yarns and weft yarns. The warp yarns and weft yarns include incomplete yarns that each have a terminal end on the pressure side or the suction side (42). The pressure side and the suction side (42) each have at least one ply drop line (82, 83) connecting the terminal ends of the incomplete yarns of the same ply. At least one ply drop line (82) includes at least one transverse portion (90) extending generally along a transverse direction (T), including an apex portion (92). The at least one apex
(Continued)

portion (92) extends over at most 10% of the distance between the leading edge (44) and the trailing edge (46).

13 Claims, 9 Drawing Sheets

(56) References Cited

U.S. PATENT DOCUMENTS

| | | | | |
|---|---|---|---|---|
| 10,590,945 | B2 * | 3/2020 | Paquin | B29C 70/08 |
| 12,644,466 | B2 * | 6/2026 | Gondre | F01D 5/14 |
| 2005/0084377 | A1 | 4/2005 | Dambrine et al. | |
| 2016/0076552 | A1 | 3/2016 | Anderson et al. | |
| 2021/0372428 | A1 * | 12/2021 | De Gaillard | B29D 99/0025 |
| 2025/0361810 | A1 * | 11/2025 | Gondre | F01D 5/282 |
| 2025/0361813 | A1 * | 11/2025 | Gondre | F01D 5/14 |

FOREIGN PATENT DOCUMENTS

| | | | |
|---|---|---|---|
| FR | 3087711 | B1 | 7/2022 |
| WO | WO 2006/136755 | A2 | 12/2006 |
| WO | WO 2020/089345 | A1 | 5/2020 |

* cited by examiner

BLADE WITH COMPOSITE STRUCTURE HAVING IMPROVED PLY DROP ORIENTATION

FIELD OF INVENTION

The present invention relates to a blade for a turbomachine fan, of the type comprising a root configured to be inserted into a cell of a fan disk, a vane capable of extending in an air flow and defining a blade head opposite the root, and a stilt connecting the root to the vane, the blade having a pressure side, a suction side, a leading edge and a trailing edge, the blade being elongated in a longitudinal direction extending from the root to the blade head, said longitudinal direction being substantially orthogonal to a chord direction extending from the leading edge to the trailing edge, the blade being composed at least in part of a structure made of composite material comprising a fiber reinforcement obtained by three-dimensional weaving and a matrix in which the fiber reinforcement is embedded, the fiber reinforcement comprising a plurality of intermingled plies, each ply being formed of warp yarns extending substantially orthogonally to the chord direction and weft yarns extending substantially orthogonally to the longitudinal direction, the warp yarns and weft yarns including incomplete yarns that each have a terminal end on the pressure side or the suction side, the pressure side and/or the suction side having ply drop lines each connecting the terminal ends of the incomplete yarns of the same ply.

The invention also relates to a turbomachine fan comprising a plurality of blades of the aforementioned type, a turbomachine comprising such a fan, and an aircraft comprising such a turbomachine.

TECHNOLOGICAL BACKGROUND

Turbomachine blades, and in particular fan blades, are subjected to significant mechanical and thermal stresses and must meet strict weight and size requirements. It has therefore been proposed to use blades composed at least in part of a composite material structure including a fiber reinforcement densified by a polymer matrix, which are lighter than metal blades with equivalent propulsive characteristics and which have satisfactory heat resistance.

Such blades are for example known from EP 1 526 285.

Most often, the blades have a decreasing thickness from the stilt to the blade head. They also become thinner towards the leading edge and towards the trailing edge. To obtain this decreasing thickness with a blade composed of a composite material structure, the number of plies composing said structure is generally reduced the closer to the blade head, the leading edge and the trailing edge. For this purpose, the yarns forming these plies are taken out of the structure and interrupted along ply drop lines on the pressure side or the suction side, as described for example in EP 3 292 991.

During the life of an engine, fan blades are subjected to bird and hail impacts. The certification rules for aircraft engines therefore logically impose a certain resistance of fan blades to this type of impact. However, the resistance of composite blades to such impacts tends to differ from that of their metallic equivalents. To comply with the certification rules, composite blades are therefore often thicker, which can make the design more complex to manage the aerodynamic performance of the blade and could partly neutralize the weight gain resulting from the use of composite material.

Solutions have been proposed, for example in EP 3 292 991, WO 2020/089345 and FR 3 087 711, to solve this type of problem and improve the mechanical behavior of blades with composite structure against such impacts. These solutions can be satisfactory but may also require optimizations.

DISCLOSURE OF THE INVENTION

A purpose of the invention is to improve the mechanical behavior of the blades with composite structure in the event of bird or hail impact.

For this purpose, the invention relates, according to a first aspect, to a blade for a turbomachine fan of the aforementioned type, in which at least one ply drop line includes at least one transverse portion located between the root and 70% of the blade height, including an apex portion, the or each transverse portion extending generally along a transverse direction substantially orthogonal to the local tangent to the warp yarns, the or each apex portion extending over at most 10% of the distance between the leading edge and the trailing edge measured parallel to the transverse direction.

According to particular embodiments of the invention, the blade also has one or more of the following characteristics, taken in isolation or in any technically possible combination (s):

- the or each transverse portion located between the root and 70% of the blade height extends over at most 10% of the distance between the leading edge and the trailing edge measured parallel to the transverse direction;
- the number of ply drop lines on the pressure side is greater than the number of ply drop lines on the suction side in a low region of the blade comprised between the root and 30% of the blade height and/or in an extended region of the blade comprised between the root and 70% of the blade height;
- the number of ply drop lines on the pressure side is, over the entire blade, greater than the number of ply drop lines on the suction side;
- at least one ply drop line comprises a terminal portion which extends from the blade head up to 90% of the blade height, advantageously up to 60% of the blade height, the or each terminal portion extending generally in a direction of extension forming an angle comprised between 5° and 85° with the local tangent to the warp yarns.
- for the or each terminal portion, the direction of extension forms an angle comprised between 5° and 85° with the local tangent to the weft yarns;
- at least one terminal portion is constituted by an inclined terminal portion whose direction of extension forms an angle comprised between 10° and 65°, advantageously comprised between 15° and 45°, with the local tangent to the warp yarns;
- for the or each inclined terminal portion, the direction of extension forms an angle comprised between 25° and 80°, advantageously comprised between 45° and 75°, with the local tangent to the weft yarns;
- a majority of the terminal portions are made up of inclined terminal portions;
- the blade comprises an attached shield covering the composite structure along the leading edge, the shield having a downstream edge on the pressure side and a downstream edge on the suction side, the or each terminal portion on the pressure side meeting at least one of the following criteria at each of its points:

the terminal portion is spaced from the downstream edge on the pressure side by a distance greater than or equal to three times the mesh width of the fiber reinforcement, and the tangent to the terminal portion forms an angle greater than or equal to 5°, advantageously greater than or equal to 15°, with the tangent to the downstream edge on the pressure side at the height of said point, and the or each terminal portion on the suction side meeting at least one of the following criteria at each of its points:

the terminal portion is spaced from the downstream edge on the suction side by a distance greater than or equal to three times the mesh width of the fiber reinforcement, and the tangent to the terminal portion forms an angle greater than or equal to 5°, advantageously greater than or equal to 15°, with the tangent to the downstream edge on the suction side at the height of said point.

The invention also relates, according to a second aspect, to a turbomachine fan comprising a plurality of blades as defined above.

The invention also relates, according to a third aspect, to a turbomachine comprising such a fan.

Finally, according to a fourth aspect, the invention relates to an aircraft comprising such a turbomachine.

BRIEF DESCRIPTION OF THE FIGURES

Other characteristics and advantages of the invention will appear upon reading the description which follows, given only by way of example and made with reference to the appended drawings, in which.

DETAILED DESCRIPTION

Figure 1:
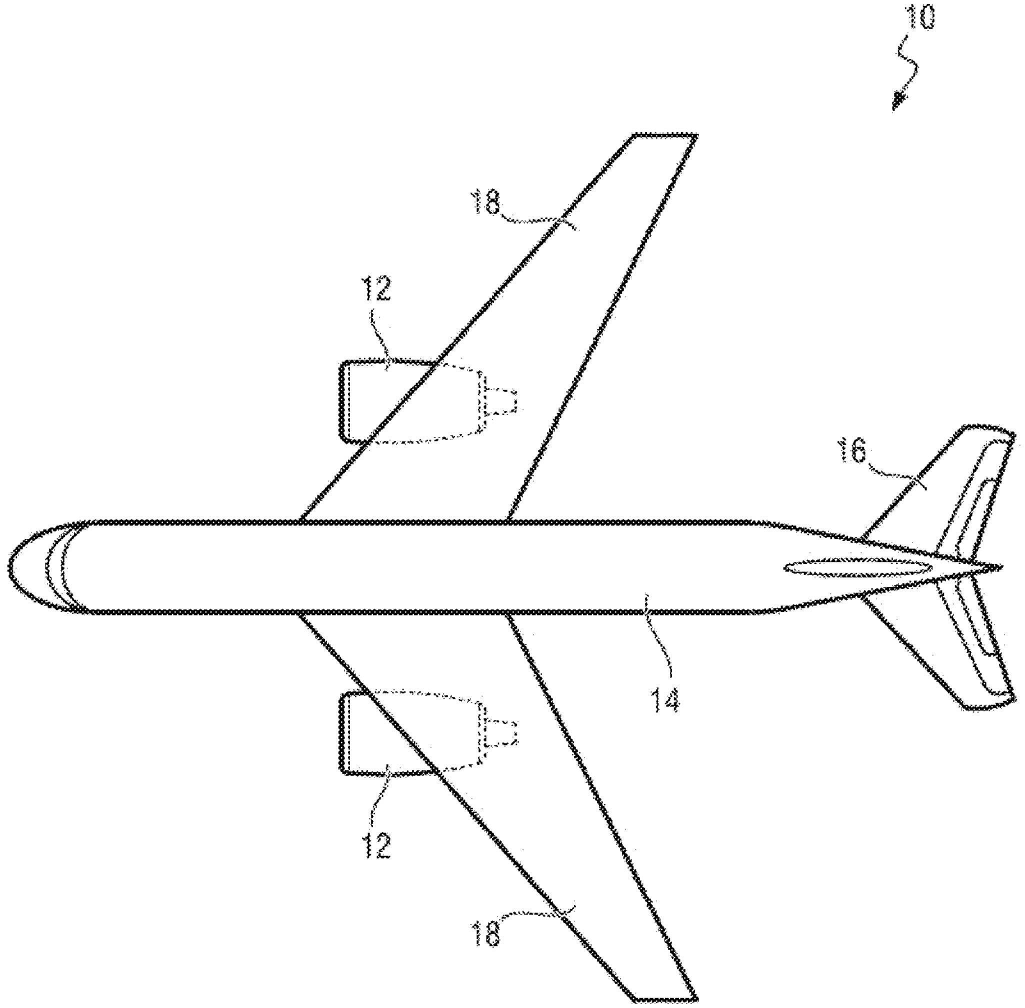
FIG. 1 is a top view of an aircraft according to an exemplary embodiment of the invention.

The aircraft 10 shown in FIG. 1 comprises turbomachines 12 to propel it.

In the example shown, the aircraft 10 is an airplane. The latter comprises, in a conventional manner, a fuselage 14, a tailplane 16 and two wings 18. The turbomachines 12 are here two in number and are each housed under a respective wing 18. As a variant (not shown), the turbomachines 12 are disposed along the fuselage 14, for example near the tailplane 16. As a further variant (also not shown), the aircraft 10 comprises a single turbomachine 12 or at least three turbomachines 12.

Figure 2:
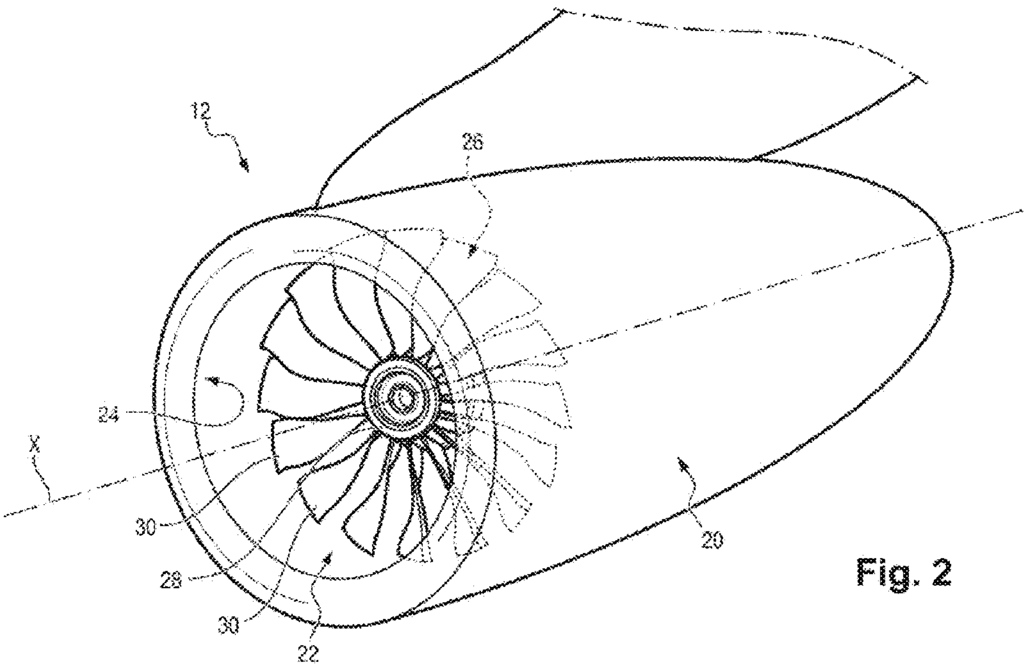
FIG. 2 is a three-quarter front perspective view of a turbomachine of the aircraft of FIG. 1.

One of the turbomachines 12 is shown in FIG. 2. As visible in this Figure, it comprises a nacelle 20 intended to be fixed to a wing 18 or to the fuselage 14 of the aircraft 10, a fan 22 and a fairing 24 surrounding the fan 22. It also comprises, in a conventional manner, a compressor, a combustion chamber and a turbine (not shown), the turbine being mechanically connected to the fan 22 to rotate it about its axis.

The turbomachine 12 is typically a double-flow turbojet engine, advantageously with a high bypass ratio.

The fairing 24 delimits the air flow path. It is fixedly mounted on the nacelle 20. In the example illustrated, it is disposed inside the nacelle 20. As a variant (not shown), the turbomachine 12 is without a fairing.

The fan 22 comprises a fan rotor 26 capable of being driven in rotation relative to the nacelle 20 around an axis of rotation X which here coincides with the main axis of the turbomachine 12. The fan rotor 26 comprises a hub 28, commonly called a "fan disk", and a plurality of blades 30 fixed to the hub 28 and extending in substantially radial directions from the hub 28. In the example shown, the blades 30 are all identical, and arranged with a constant angular spacing between two successive blades 30.

Figure 3:
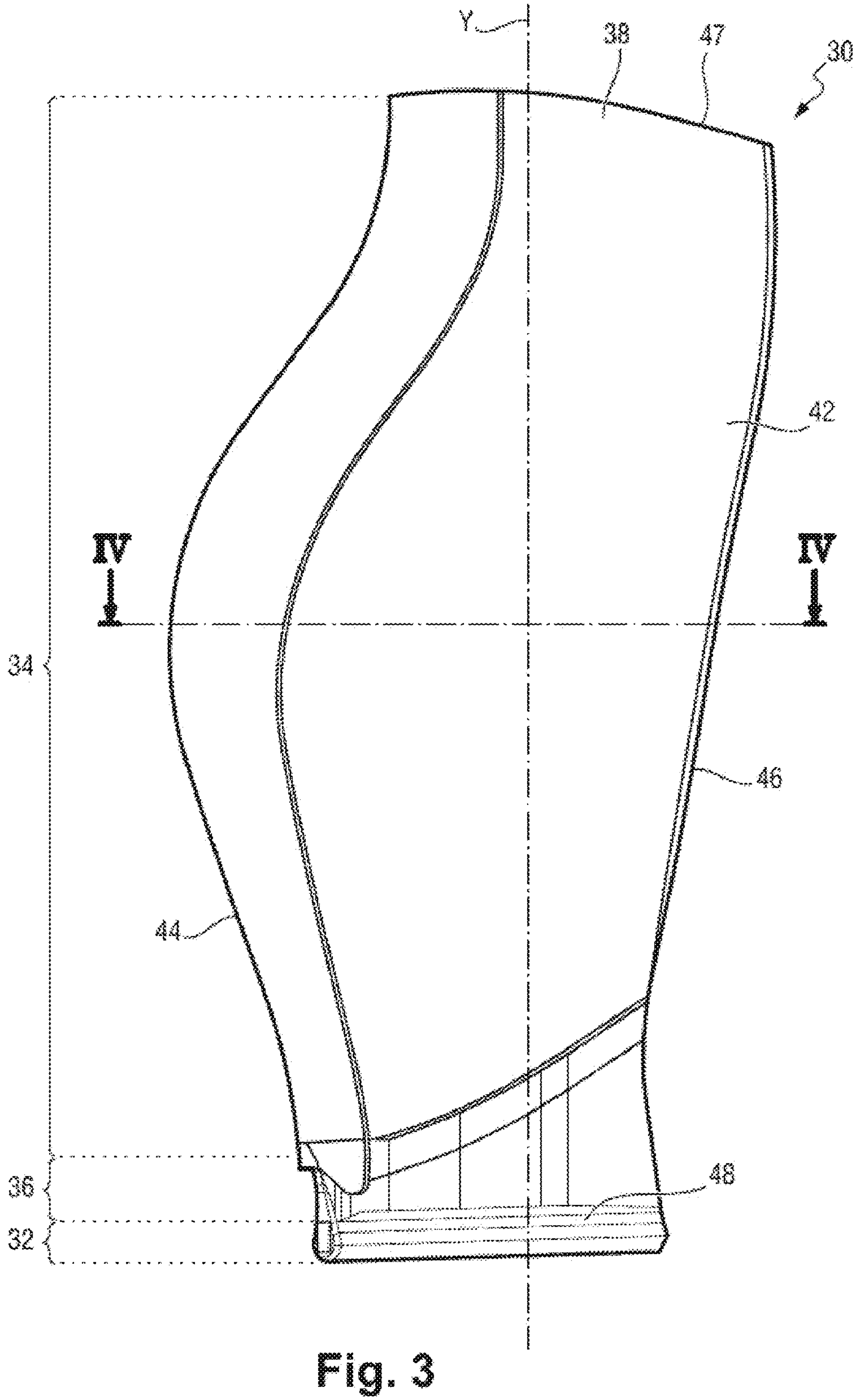
FIG. 3 is a side view of a fan blade of the turbomachine of FIG. 2.

FIG. 3 schematically illustrates one of these blades 30. This blade 30 comprises a root 32, a vane 34 with an aerodynamic profile and a stilt 36.

The root 32 is intended to allow the blade 30 to be fixed to the hub 28, for example by means of a pinned fastener (not shown). For this purpose, the root 32 is configured to be inserted into a cell (not shown) of the hub 28.

In the example shown, the root 32 is dovetail-shaped. As a variant (not shown), the root 32 has any shape adapted to allow the blade 30 to be assembled to the hub 28.

The vane 34 is suitable for being placed in an air flow, when the turbomachine 12 is in operation, in order to generate lift. It defines, at its end opposite the root 32, a blade head 38.

The vane 34 also has a pressure side 40 (FIG. 4), a suction side 42, a leading edge 44 and a trailing edge 46.

The vane 34 also has a blade head edge 47, consisting of the free edge of the blade 30 furthest from the root 32. The blade head edge 47 is capable of extending along an inner surface of the fairing 24 surrounding the fan.

The stilt 36 corresponds to the area of the blade 30 which extends between the root 32 and the vane 34, that is to say between the drop of the bearing surfaces 48 and the inter-blade platforms (not shown) which internally delimit the secondary flow path. The stilt 36 is therefore not configured to extend into an air flow.

The blade 30 is elongated along a longitudinal axis Y orthogonal to the axis X and extending from the root 32 to the head 38. The longitudinal axis Y is also orthogonal to a chord direction C (FIG. 4) connecting the leading edge 44 to the trailing edge 46.

Here and hereinafter, "blade height" means a distance measured along the axis Y between a point on the blade 30 and the drop of the bearing surfaces 48. This distance is most often expressed in a dimensionless manner, as a percentage of the distance from the leading edge 47 to the drop of the bearing surfaces 48.

Figure 4:
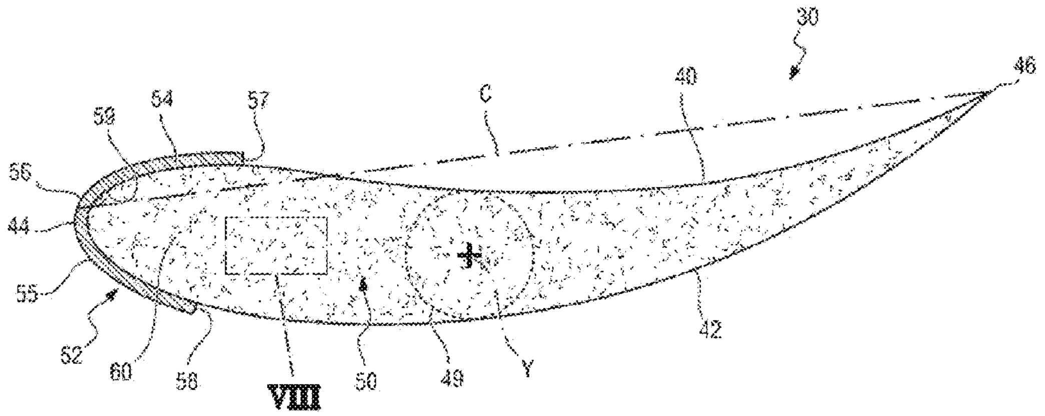
FIG. 4 is a simplified sectional view along a plane marked IV-IV in FIG. 3.

As visible in FIG. 4, the blade 30 has a blade core 49 at which the thickness of the blade 30 along the chord direction C is maximum. In other words, the thickness of the blade 30 decreases from the blade core 49 towards each of the leading edge 44 and trailing edge 46. The blade core 49 is in particular centered on the longitudinal axis Y.

In the example shown, the blade 30 is twisted around the blade core 49, so that the chord C pivots around the longitudinal axis Y according to the blade height.

With reference to FIG. 4, the blade 30 is here composed of a structure 50 made of composite material. As visible in FIGS. 5 and 6, this structure 50 here extends along the longitudinal axis Y from the root 32 to the head 38, along the chord direction C from the leading edge 44 to the trailing edge 46 and along the thickness of the blade 30 from the pressure side 40 to the suction side 42. In particular, the structure 50 substantially matches the shape of the blade 30. Optionally, it defines, at least in part, the outer surface of the blade 30.

Because of this proximity of shape between the blade 30 and the structure 50, the same terms will be used here and hereinafter to designate both surface regions of the blade 30 and the elements of the structure 50 relating thereto. Thus, the term "pressure side 40" designates both the pressure side of the blade 30 itself, but also the face of the structure 50 on the side of the pressure side, even though this face does not directly define the pressure side of the blade 30 (that is to say even if the face of the structure 50 on the side of the pressure side is covered with another element). Similarly, the term "suction side 42" designates both the suction side of the blade 30 itself, but also the face of the structure 50 on the side of the suction side, even though this face does not directly define the suction side of the blade 30 (that is to say even if the face of the structure 50 on the side of the suction side is covered with another element).

The structure 50 is commonly referred to as the "body" of the blade 30.

Still referring to FIG. 4, the blade 30 is here also composed of an attached shield 52 covering the composite structure 50 along the leading edge 44. This shield 52 is formed of two fins 54, 55 connected together at the apex 56 of the shield 52. A first fin 54, disposed on the side of the pressure side 40, defines a downstream edge on the pressure side 57 of the shield 52. The second fin 55, disposed on the side of the suction side 42, defines a downstream edge on the suction side 58 of the shield 52.

The two fins 54, 55 define therebetween a cavity 59 in which an upstream end 60 of the structure 50 is housed.

The shield 52 is typically made of metal foil.

Figure 7:
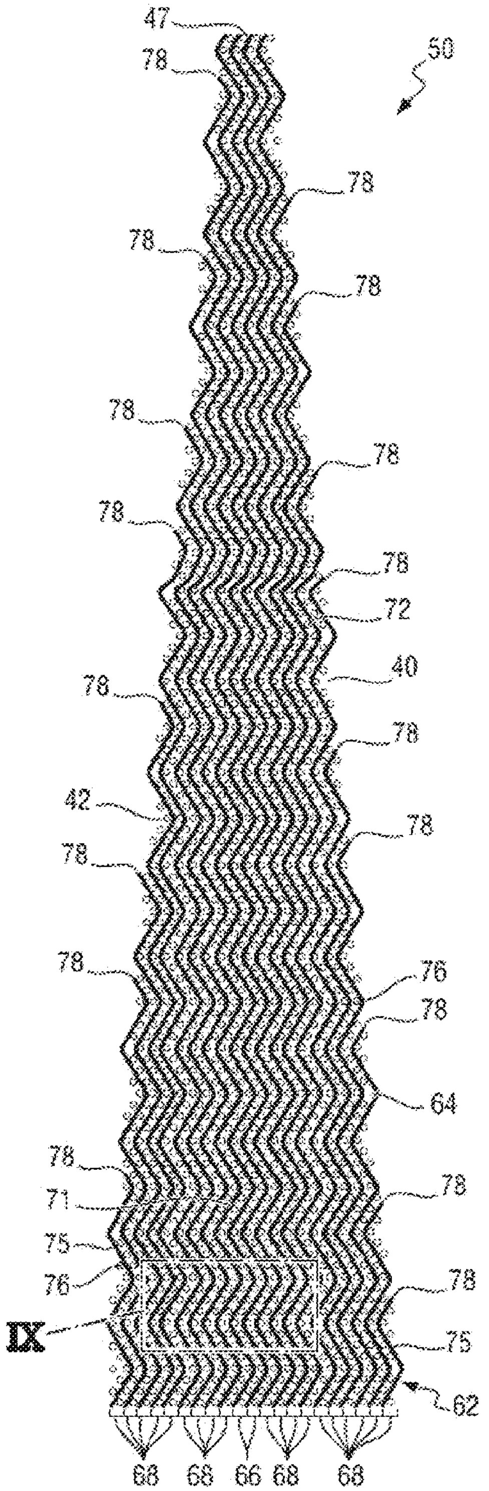
FIG. 7 is a simplified sectional view, along a plane marked VII-VII in FIG. 6, of a part of the composite material structure.

With reference to FIG. 7, the structure 50 comprises a fiber reinforcement 62 and a matrix 64 in which the fiber reinforcement 62 is embedded.

The fiber reinforcement 62 comprises a plurality of intermingled plies 66, 68, stacked along the thickness of the blade 30, that is to say along the direction from the pressure side 40 to the suction side 42.

Each ply 66, 68 is formed of warp yarns 71 and weft yarns 72. Each warp yarn 71 extends from the root 32 towards the head 38, substantially orthogonal to the chord direction C. Each weft yarn 72 extends from the blade core 49 towards each of the leading edge 44 and trailing edge 46, substantially orthogonal to the longitudinal axis Y.

"Substantially orthogonally" means here and hereinafter that the yarns 70, 72 form an angle comprised between 85 and 95° with the concerned direction or axis (here respectively the chord direction C and the longitudinal axis Y)

The fiber reinforcement 62 is obtained by three-dimensional weaving, that is to say that at least some of the warp yarns 71 belonging to a ply 66, 68 bind weft yarns 72 belonging to another ply 66, 68. Three-dimensional weaving techniques are described for example in WO 2006/136755.

Figure 8:
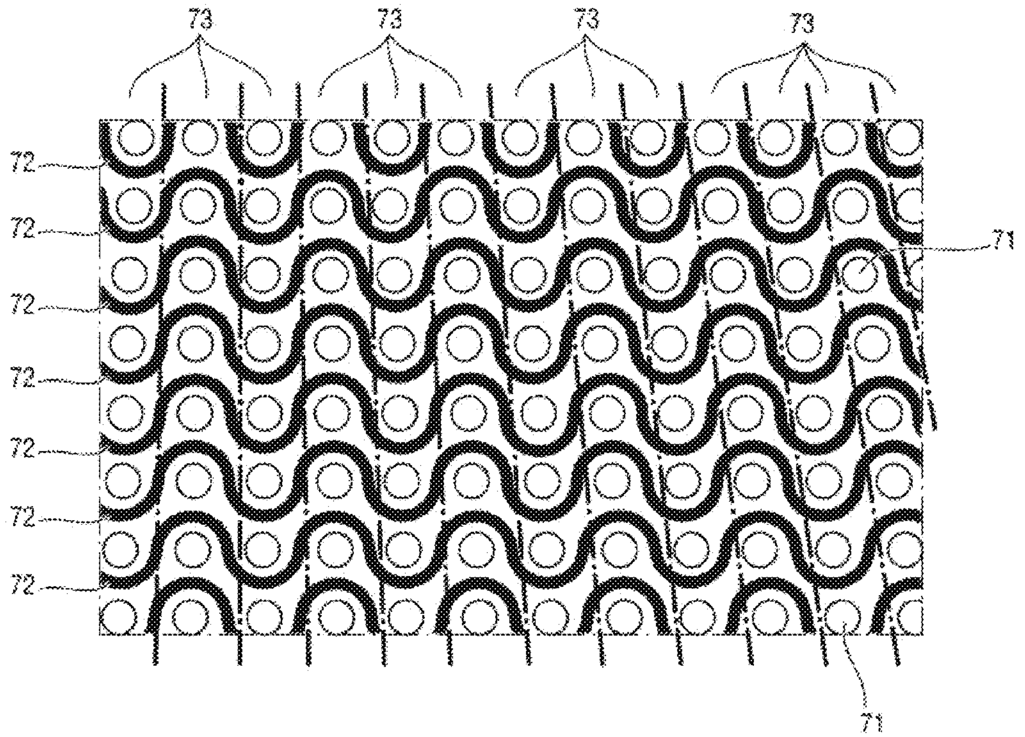
FIG. 8 is a view of a detail marked VIII of FIG. 4.

As visible in FIG. 8, the warp yarns 71 are arranged in warp columns 73 each formed by the juxtaposition, along the thickness of the blade 30, of the warp yarns 71 of the different plies 66, 68. Thus, each warp column 73 extends along a surface roughly orthogonal to the chord direction C.

Each warp yarn 71 belongs to a single warp column 73.

Each chain column 73 is substantially parallel to its neighbors. In other words, for each blade height, the normal to each chain column 73 forms an angle less than or equal to 5° with the normal to each of its neighbors.

The view of FIG. 7 corresponds to a section in a warp column 73. FIG. 7 thus illustrates one of the many planes which are repeated along the chord direction C between the leading edge 44 and the trailing edge 46. The other planes are similar to the illustrated plane, except that the warp yarns 71 are offset in the longitudinal direction such that the warp yarns 71 and the weft yarns 72 are bound at different heights according to the planes.

Figure 9:
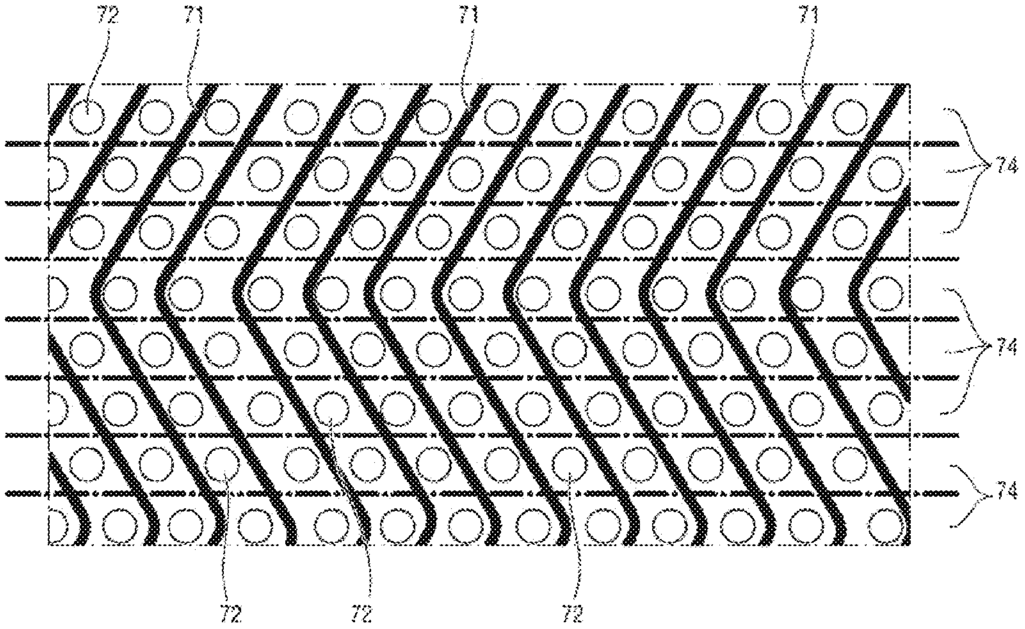
FIG. 9 is a view of a detail marked IX of FIG. 7.

As visible in FIG. 9, the weft yarns 72 are arranged according to weft columns 74 each formed by the juxtaposition, along the thickness of the blade 30, of the weft yarns 72 of the different plies 66, 68. Thus, each weft column 74 extends along a surface substantially orthogonal to the longitudinal axis Y.

Each weft yarn 72 belongs to a single weft column 74.

Each frame column 74 is substantially parallel to its neighbors. In other words, the normal to each frame column 74 forms an angle less than or equal to 5° with the normal to each of its neighbors.

Moreover, each weft column 74 is substantially orthogonal to each warp column 73, that is to say that, for each weft column 74 warp column 73 pair, the average normal to the weft column 74 is substantially orthogonal to the average normal to the warp column 73.

Returning to FIG. 7, the plies 66, 68 comprise at least one full ply 66, each of the warp yarns 71 extending from the root 32 to the head 38 and each of the weft yarns 72 extends from the leading edge 44 to the trailing edge 46, and partial plies 68 comprising incomplete warp yarns 75 and/or incomplete weft yarns 76. The incomplete warp yarns 75 are constituted by warp yarns 71 interrupting at the surface of the structure 50, before the head 38, to allow a reduction in the thickness of the blade 30 along the longitudinal axis Y. The incomplete weft yarns 76 are constituted by weft yarns 72 interrupting at the surface of the structure 50, before the leading edge 44 and/or the trailing edge 46, to allow a reduction in the thickness of the blade 30 along the chord direction C.

It will be noted that a first yarn 71, 72 which, although interrupted on the pressure side 40 or on the suction side 42, is extended by a second yarn 71, 72 starting substantially where the first yarn 71, 72 ends is not considered to constitute an incomplete yarn 75, 76.

Each incomplete yarn 75, 76 has at least one terminal end 78 on the pressure side 40 or the suction side 42. The terminal ends 78 of the incomplete yarns 75, 76 of the same ply 68 are spaced two by two by a distance of the order of the mesh width of the fiber reinforcement 62.

"Mesh width of the fiber reinforcement 62" means here and hereinafter the average between, on the one hand, the average distance between the warp columns 73 and, on the other hand, the average distance between the weft columns 74.

For each partial ply 68, the terminal ends 78 of the incomplete yarns 75, 76 composing it are connected to each other by a respective ply drop line 80, 81, 82, 83 (FIGS. 5 and 6) present on the pressure side 40 or on the suction side 42. This ply drop line 80, 81, 82, 83 is constituted by a curve of class at least $C^1$ (or by a set of two curves each of class at least $C^1$) running through the pressure side 40, respectively the suction side 42.

Each ply drop line 80, 81, 82, 83 forms a boundary between two regions of the blade (not referenced): an inner region extending between the ply drop line 80, 81, 82, 83 and the root 32 and an outer region extending between the ply drop line 80, 81, 82, 83 and each of the leading edge 44, trailing edge 46 and head edge 47. The inner region has at each point a number of yarns 71, 72 stacked along the thickness of the blade 30 greater than or equal to a first value. The outer region has at each point a number of yarns 71, 72 stacked along the thickness of the blade 30 less than or equal to a second value strictly less than the first value. In other words, the number of yarns 71, 72 stacked along the thickness of the blade 30 is lower in the outer region than in the inner region.

Here, the number of ply drop lines 80, 81 on the pressure side 40 is greater than the number of ply drop lines 82, 83 on the suction side 42 in a low region of the blade 30 extending from the root 32 to 30% of the blade height. This numerical superiority of the ply drop lines 80, 81 on the pressure side 40 over the ply drop lines 82, 83 on the suction side 42 is still observed in an extended region of the blade 30 extending from the root 32 to 70% of the blade height and even over the entire blade 30. As a variant (not shown), the numerical superiority of the ply drop lines 80, 81 on the pressure side 40 over the ply drop lines 82, 83 on the suction side 42 is observed only in the lower region of the blade 30 (that is to say the number of ply drop lines 80, 81 on the pressure side 40 is less than the number of ply drop lines 82, 83 on the suction side 42 in an intermediate region of the blade 30 extending from 30% of the blade height to 70% of the blade height) or only in the lower and extended regions of the blade 30 (that is to say the number of ply drop lines 80, 81 on the pressure side 40 is less than the number of ply drop lines 82, 83 on the suction side 42 in the region extending beyond 70% of the blade height). As a further variant (still not shown), the numerical superiority of the ply drop lines 80, 81 on the pressure side 40 over the ply drop lines 82, 83 on the suction side 42 is observed in the extended region of the blade 30 but not in the lower region (that is to say the number of ply drop lines 80, 81 on the pressure side 40 is less than or equal to the number of ply drop lines 82, 83 on the suction side 42 in the lower region of the blade 30 and greater than the number of ply drop lines 82, 83 on the suction side 42 in the intermediate region).

This feature gives the blade 30 improved resistance to large bird type impacts.

Figure 5:
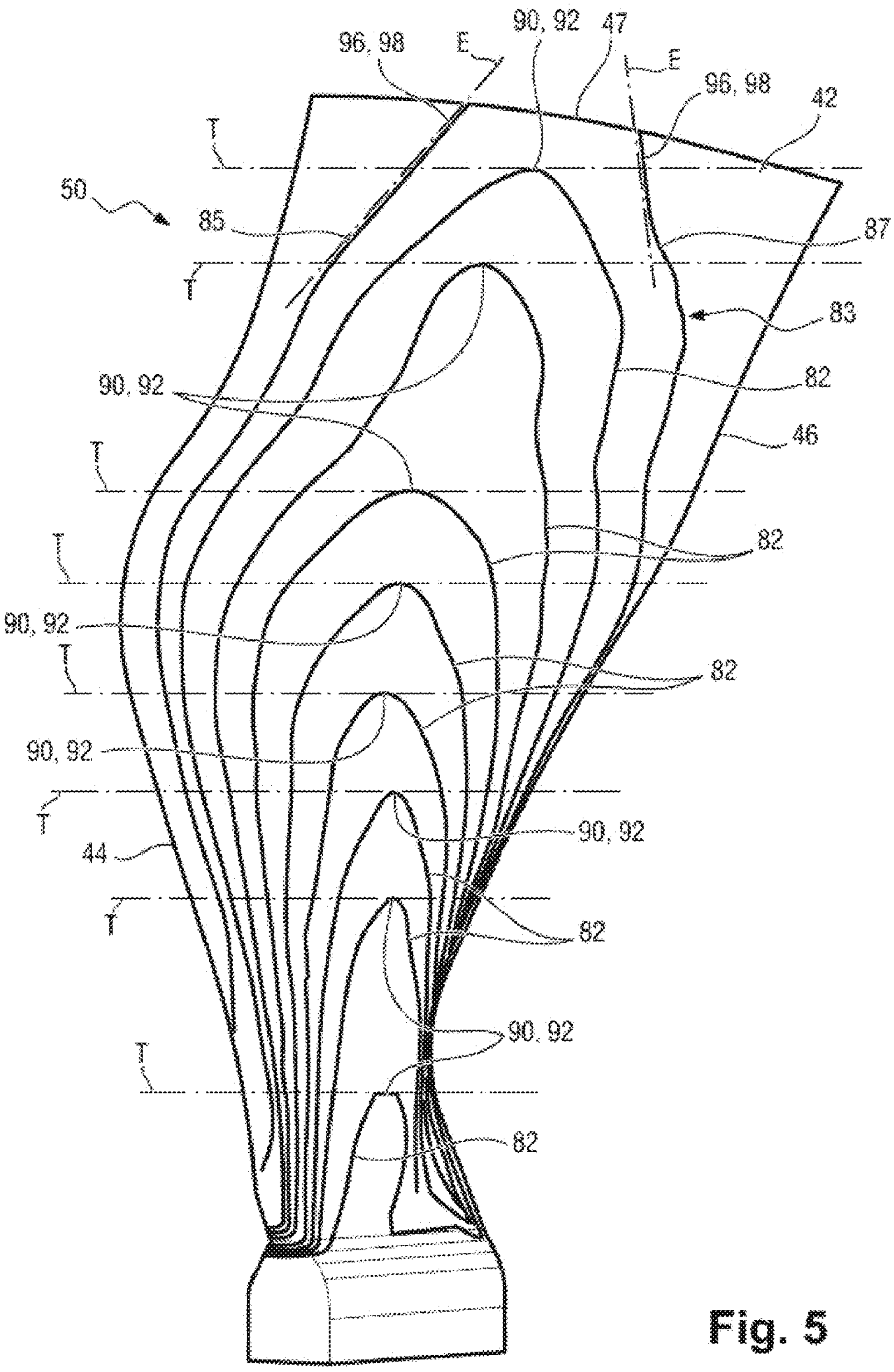
FIG. 5 is a three-quarter front perspective view of a composite material structure of the blade of FIG. 3.
Figure 6:
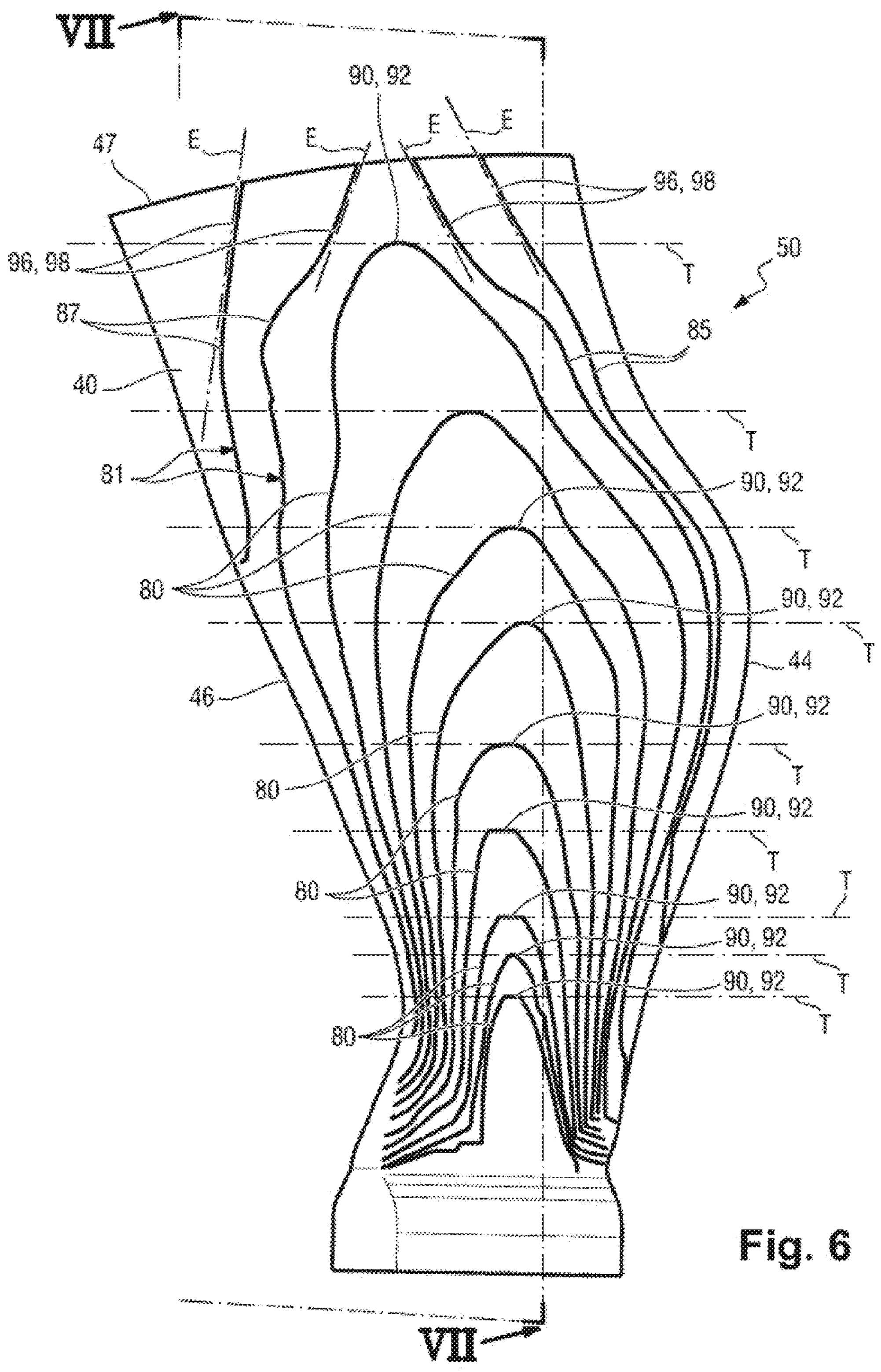
FIG. 6 is a three-quarter rear perspective view of the composite material structure of FIG. 5.

As can be seen in FIGS. 5 and 6, the ply drop lines 80, 81, 82, 83 include continuous ply drop lines 80, 82 and discontinuous ply drop lines 81, 83. Each continuous ply drop line 80, 82 is constituted by a single curve of class at least $C^1$ running along the pressure side 40, respectively the suction side 42, from the leading edge 44 to the trailing edge 46. Each discontinuous ply drop line 81, 83 comprises a first section 85 constituted by a curve of class at least $C^1$ running along the pressure side 40, respectively the suction side 42, from the leading edge 44 to the leading edge 47 and a second section 87 constituted by a curve of class at least $C^1$ running along the pressure side 40, respectively the suction side 42, from the head edge 47 to trailing edge 46.

Each continuous ply drop line 80, 82 has an apex (not referenced), constituted by the point of the ply drop line 80, 82 furthest from the root 32.

Each continuous ply drop line 80, 82 includes at least one transverse portion 90 extending generally along a transverse direction T substantially orthogonal to the local tangent to the warp yarns 71. In other words, for each of the incomplete warp yarns 75 opening onto the transverse portion 90, the transverse direction T is substantially orthogonal to the plane locally tangent to the warp column 73 to which said incomplete warp yarn 75 belongs, that is to say to the plane tangent to said warp column 73 at the terminal end 78 of the incomplete warp yarn 75.

"Extends generally in a direction", means here and hereinafter that the concerned element (here the transverse portion 90) is included in a band centered on said direction and of width equal to four times the mesh width of the fiber reinforcement 62. In other words, said direction constitutes a median of the concerned element and each point of said element is distant from said direction by a distance less than or equal to twice the mesh width of the fiber reinforcement 62.

"Substantially orthogonal" means here and hereinafter that the concerned directions form an angle therebetween comprised between 85 and 95°.

The transverse direction T is also substantially parallel to the local tangent to the weft yarns 72. In other words, each of the weft yarns 72 flush with the pressure side 40 or the suction side 42 along the transverse direction T is substantially parallel to said transverse direction T over the entire extension of the transverse portion 90.

"Substantially parallel" means here and hereinafter that the concerned directions form an angle therebetween less than or equal to 5°.

A transverse portion 90 of each continuous ply drop line 80, 82 is constituted by an apex portion 92 including the apex of said ply drop line 80, 82. Each apex portion 92 located between the root 32 and 70% of the blade height extends over at most 10% of the distance between the leading edge 44 and the trailing edge 46 measured parallel to the transverse direction T.

Generally, each transverse portion 90 located between the root 32 and 70% of the blade height extends over at most 10% of the distance between the leading edge 44 and the trailing edge 46 measured parallel to the respective transverse direction T of said transverse portion 90.

This management of the drop locations of the yarns 71, 72 allows to optimize their robustness. Thus, the resistance of the blade 30 to "large bird" type impacts is reinforced.

Each discontinuous ply drop line 81, 83 comprises at least one terminal portion 96 which extends from the blade head 38, in particular from the head edge 47, up to 90% of the blade height, advantageously 60% of the blade height.

This terminal portion 96 extends generally in a direction E of extension forming an angle comprised between 5° and 85° with the local tangent to the warp yarns 71. In other words, for each of the incomplete warp yarns 75 opening onto the terminal portion 96, the direction E of extension forms an angle comprised between 5° and 85° with the plane locally tangent to the warp column 73 to which said incomplete warp yarn 75 belongs, that is to say with the plane tangent to said warp column 73 at the terminal end 78 of the incomplete warp yarn 75.

The direction E of extension also forms an angle comprised between 5° and 85° with the local tangent to the weft yarns 72. In other words, for each of the incomplete weft yarns 76 opening onto the terminal portion 96, the direction E of extension forms an angle comprised between 5° and 85° with the plane locally tangent to the weft column 74 to which said incomplete weft yarn 76 belongs, that is to say with the plane tangent to said weft column 74 at the terminal end 78 of the incomplete weft yarn 76.

Each terminal portion 96 on the side of the pressure side 40 also meets at least one of the following criteria at each of its points:

- the terminal portion 96 is spaced from the downstream edge on the pressure side 57 of the shield 52 by a distance greater than or equal to three times the mesh width of the fiber reinforcement 62, and
- the tangent to the terminal portion 96 forms an angle greater than or equal to 5°, advantageously greater than or equal to 15°, with the tangent to said downstream edge on the pressure side 57 at the height of said point.

In other words, for any section of a terminal portion 96 on the side of the pressure side 40 distant from the downstream edge on the pressure side 57 of the shield 52 by a distance less than three times the mesh width of the fiber reinforcement 62, the tangent to the terminal portion 96 at each point of said section forms an angle greater than or equal to 5°, advantageously greater than or equal to 15°, with the tangent to said downstream edge on the pressure side 57 at the height of said point.

Each terminal portion 96 on the side of the suction side 42 also meets at least one of the following criteria at each of its points:

- the terminal portion 96 is spaced from the downstream edge on the suction side 58 of the shield 52 by a distance greater than or equal to three times the mesh width of the fiber reinforcement 62, and
- the tangent to the terminal portion 96 forms an angle greater than or equal to 5°, advantageously greater than or equal to 15°, with the tangent to said downstream edge on the suction side 58 at the height of said point.

In other words, for any section of a terminal portion 96 on the side of the suction side 42 distant from the downstream edge on the suction side 58 of the shield 52 by a distance less than three times the mesh width of the fiber reinforcement 62, the tangent to the terminal portion 96 at each point of said section forms an angle greater than or equal to 5°, advantageously greater than or equal to 15°, with the tangent to said downstream edge on the suction side 58 at the height of said point.

A majority of said terminal portions 96, here all the terminal portions 96, are constituted by inclined terminal portions 98 whose direction E of extension forms an angle comprised between 10° and 65°, advantageously comprised between 15° and 45°, with the local tangent to the warp yarns 71. In other words, for each of the incomplete warp yarns 75 opening onto an inclined terminal portion 98, the direction E of extension of said inclined terminal portion 98 forms an angle comprised between 10° and 65°, advantageously comprised between 15° and 45°, with the plane locally tangent to the warp column 73 to which said incomplete warp yarn 75 belongs, that is to say with the plane tangent to said warp column 73 at the terminal end 78 of the incomplete warp yarn 75.

For each inclined terminal portion 98, the direction E of extension also forms an angle comprised between 25° and 80°, advantageously comprised between 45° and 75°, with the local tangent to the weft yarns 72. In other words, for each of the incomplete weft yarns 76 opening onto the inclined terminal portion 98, the direction E of extension of said inclined terminal portion 98 forms an angle comprised between 25° and 80°, advantageously comprised between 45° and 75°, with the plane locally tangent to the weft column 74 to which said incomplete weft yarn 76 belongs, that is to say with the plane tangent to said weft column 74 at the terminal end 78 of the incomplete weft yarn 76.

These characteristics give the blade 30 increased resistance to "small bird" type impacts.

Thanks to the characteristics of the embodiment described above, the mechanical behavior of a blade with composite structure in the event of bird or hail impact is improved. This allows to refine the blade while maintaining a constant resistance, and thus to gain in weight and aerodynamic performance.

The invention claimed is:

1. A blade for a turbomachine fan, comprising a root configured to be attached to a fan disk and a vane capable of extending in an air flow and defining a blade head opposite the root, a pressure side, a suction side, a leading edge and a trailing edge, the blade being elongated in a longitudinal direction extending from the root to the blade head, said longitudinal direction being substantially orthogonal to a chord direction extending from the leading edge to the trailing edge, the blade being composed at least in part of a structure made of composite material comprising a fiber reinforcement obtained by three-dimensional weaving and a matrix in which the fiber reinforcement is embedded, the fiber reinforcement comprising a plurality of intermingled plies, each ply being formed of warp yarns extending substantially orthogonally to the chord direction and weft yarns extending substantially orthogonally to the longitudinal direction, the warp yarns and weft yarns including incomplete yarns that each have a terminal end on the pressure side or the suction side, the pressure side and/or the suction side having ply drop lines each connecting the terminal ends of the incomplete yarns of a same ply of the plies, wherein at least one of the ply drop lines includes a transverse portion, including an apex portion, located between the root and 70% of a height of the blade, the or each transverse portion extending generally along a transverse direction substantially orthogonal to a local tangent to the warp yarns, the or each apex portion extending over at most 10% of a distance between the leading edge and the trailing edge measured parallel to the transverse direction.

2. The blade of claim 1, wherein the or each transverse portion located between the root and 70% of the height of the blade extends over at most 10% of the distance between the leading edge and the trailing edge measured parallel to the transverse direction.

3. The blade of claim 1, wherein the ply drop lines are, over the entire blade, in greater number on the pressure side than on the suction side.

4. The blade of claim 1, wherein at least one of the ply drop lines comprises a terminal portion which extends from the blade head to a location that is up to 90% of the height of the blade from the root, the or each terminal portion extending generally in a direction of extension forming an angle comprised between 5° and 85° with a local tangent to the warp yarns.

5. The blade of claim 4, wherein, for the or each terminal portion, the direction of extension forms an angle comprised between 5° and 85° with a local tangent to the weft yarns.

6. The blade of claim 4, wherein one or more of the at least one terminal portion is constituted by an inclined terminal portion whose direction of extension forms an angle comprised between 10° and 65° with the local tangent to the warp yarns.

7. The blade of claim 6, wherein, for the or each inclined terminal portion, the direction of extension forms an angle comprised between 25° and 80° with a local tangent to the weft yarns.

8. The blade of claim 6, wherein the at least one terminal portion is a plurality of terminal portions, and wherein a majority of the terminal portions are made up of the inclined terminal portions.

9. The blade of claim 4, comprising an added shield covering the composite structure along the leading edge, the shield having a downstream edge on the pressure side and a downstream edge on the suction side, the or each terminal portion on the pressure side being made up of a plurality of points and meeting at least one of the following criteria at each of its points:

the terminal portion is spaced from the downstream edge on the pressure side by a distance greater than or equal to three times a mesh width of the fiber reinforcement, and a tangent to the terminal portion forms an angle greater than or equal to 5° with a tangent to the downstream edge on the pressure side at the height of said point, and the or each terminal portion on the suction side being made up of a plurality of points and meeting at least one of the following criteria at each of its points:

the terminal portion is spaced from the downstream edge on the suction side by a distance greater than or equal to three times the mesh width of the fiber reinforcement, and a tangent to the terminal portion forms an angle greater than or equal to 5° with a tangent to the downstream edge on the suction side at the height of said point.

10. The blade of claim 1, wherein the root is configured to be inserted into a cell of a fan disk, a stilt connecting the root to the vane.

11. A turbomachine fan comprising a plurality of the blade of claim 1.

12. A turbomachine comprising the fan of claim 11.

13. An aircraft comprising the turbomachine of claim 12.

* * * * *